Patented Jan. 30, 1945

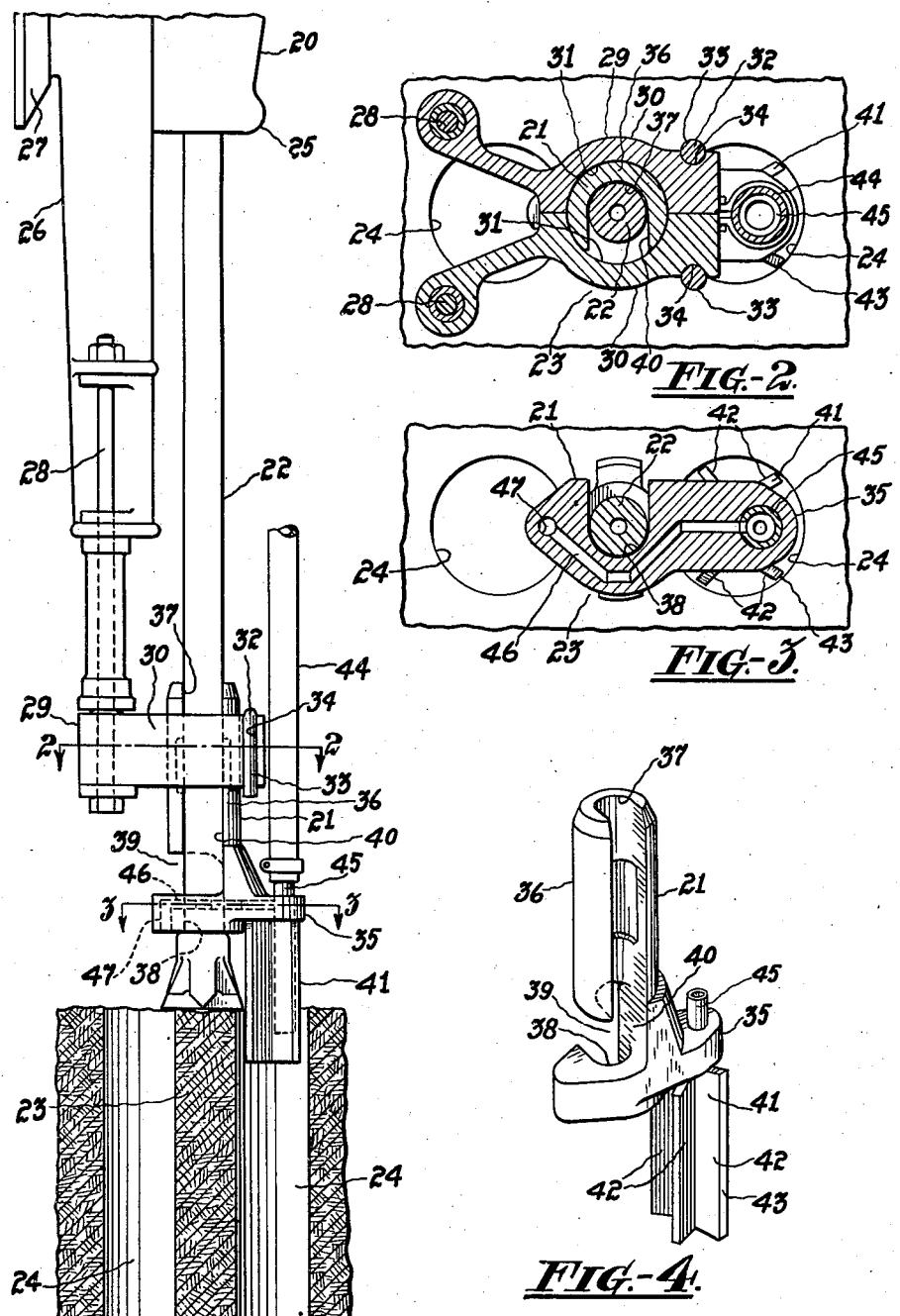

2,368,511

UNITED STATES PATENT OFFICE 2,368,511

GUIDE FOR DRILL STEELS

Robert D. Zimmerman, Phillipsburg, N. J., assignor to Ingersoll-Rand Company, New York, N. Y., a corporation of New Jersey Application August 6, 1942, Serial No. 453,794

3 Claims. (Cl. 255—62)

This invention relates to guiding devices, and more particularly to a guide for drill steels of mechanisms employed for cutting rock in the form of blocks from the mass.

According to one method of removing dimension blocks of rock series of holes are drilled along lines forming the bounding surfaces of a block. The drill holes are spaced rather accurately with respect to each other and in such wise that the walls separating them may be conveniently spanned by a cutting implement serving to break them down in order to connect adjacent drill holes with each other.

Inasmuch as the cutting implement is of a size to partly overlap the drill holes it is a difficult matter to maintain the cutting end of the implement on the desired course and, unless the drilling implement is suitably guided, it will creep laterally in the direction of a drill hole and often necessitate a complete repositioning of the drilling apparatus with respect to the work. In this way, a great deal of time is often wasted and the strains imposed upon the movable parts of the drilling mechanism by reason of the inclined position of the drilling implement with respect to the rock drill subjects certain essential bearing portions of the drilling mechanism to undue wear.

It is accordingly an object of the present invention to provide means for maintaining the cutting bit of the drilling mechanism in substantially the correct position with respect to the work throughout the entire line of cut, and a further object is to stabilize the bit end of the cutting implement so that it will remain substantially coaxial with the rock drill during the starting of a drilling operation.

Other objects will be in part obvious and in part pointed out hereinafter.

In the drawing accompanying this specification,

Figure 1 is a side elevation of a guide constructed in accordance with the practice of the invention and so much of a rock drilling mechanism as will serve to illustrate a practical application of the invention, Figures 2 and 3 are transverse views taken through Figure 1 on the lines 2—2 and 3—3, respectively, and Figure 4 is a perspective view of the guide.

Referring more particularly to the drawing, 20 designates a rock drilling mechanism and 21 a guide constructed in accordance with the practice of the invention for guiding a working implement 22 actuated by the drilling mechanism for removing the wall of rock 23 between a pair of drill holes 24.

For the sake of simplicity of illustration, only the front part of the drilling mechanism 20 is shown. It includes a rock drill 25 into which the working implement 22 may extend to receive the blows of a percussive element (not shown). A shell 26 serves as a guide for the rock drill 25 and has a cone 27 whereby the shell may be attached to a suitable supporting device for holding the drilling mechanism in the correct position with respect to the work.

On the front end of the shell 26, and secured thereto by bolts 28, is a centralizer 29 of the type commonly employed for maintaining the working implement in axial alignment with the rock drill. The centralizer shown is of the type forming the subject matter of United States Patent No. 1,719,468 to C. C. Hansen and accordingly comprises a pair of arms 30 which are pivoted at one end to the bolts 28 and have registering recesses 31 in their opposed surfaces to receive the working implement. The arms 30 are normally held together in guiding position by a U-clamp 32 having its stem portions 33 seated in grooves 34 in the outer surfaces of the arms.

In the form of the invention shown the guide comprises a body 35 that is of such length that it only partly overlaps both holes adjacent a wall intended to be drilled to permit of the ejection of cuttings from the drill holes exteriorly of the end portions of the body. The body has a stem 36 of generally cylindrical shape at its rearward side to extend slidably into the recesses 31 of the centralizer, and in the stem 36 is a U-shaped guideway 37 to slidably receive the body of the working implement 22 for guiding it. The guideway 37 opens from the peripheral surface of the stem 36 along the entire length thereof and is only sufficiently larger than the diameter of the working implement so that the latter may have a nice sliding fit within the guideway.

The body 35 is likewise provided with a U-shaped guideway 38 that is coaxial with the guideway 37 and opens from a side of the body opposite to the opening of the guideway 37. In this way the curved portions of the guideways 37 and 38 will serve as opposed bearing surfaces for the working implement at spaced points along the length of said working implement.

One side of the stem 36 is separated from the body 35 by a space 39 that extends to the inner side 40 of the guideway 37 and is of somewhat greater width than the diameter of the working implement so that the latter may readily pass through the space 39 in position for entrance into the guideways 37 and 38.

In order to assure the correct position of the working implement with respect to the wall 23 the body is provided, at its forward side, with a pilot 41 to extend into one of the drill holes 24 and cooperate with the wall thereof for preventing lateral movement of the guide. The pilot 41 is offset with respect to the stem 36 and may be attached to the body 35 in any well known manner, as for example by welding. In a preferred form the pilot is fluted externally to permit the free flow of cuttings to the space between the adjacent end portion of the body and the wall of the drill hole and, as shown, consists of a plurality of radially extending wings 42 the outer edges 43 of which serve as bearing surfaces to engage the wall of the drill hole.

To the end that the cuttings resulting from the breaking down of the wall 23 may be expelled from both drill holes 24 defining the wall being drilled the guide is provided with means for directing jets of pressure fluid into said drill holes. Such pressure fluid is conveyed to the guide by a hose 44 attached to a tube 45 which extends through the body 35 adjacent the pilot 41. The tube 45 may be secured to the body in any well known manner and is so positioned that its outlet opening directs a stream of pressure fluid longitudinally of the drill hole and in parallelism with the direction of movement of the working implement 22.

The body 35 also has a passage 46 that extends from one end portion to another of the body and opens at one end into the tube 45 and has a forwardly directed outlet opening 47 at its other end to direct a stream of pressure fluid into the other drill hole of a pair for maintaining said hole free of cuttings.

In operation, the guide 21 is placed in guiding position on the working implement 22 and the stem 36 is then inserted in the centralizer 29. After the drilling mechanism has been correctly positioned with respect to the work the guide is moved forwardly in the centralizer until the pilot 41 extends into one of the drill holes 24. In this way the cutting end of the working implement will be held against undue gyratory movement during the starting of the new cut and as drilling proceeds the guide will gradually slide out of the centralizer and descend through the new cut and the adjacent drill holes and will maintain the cutting end of the working implement on the desired course throughout the complete operation of breaking down the wall 23.

During drilling in the manner described, pressure fluid flows from the tube 45 and the outlet opening 47 and blows the rock particles and dust from the drill holes 24 as rapidly as they are broken away from the wall 23. The drill holes will thus be kept free of cuttings so that the guide may descend freely and at all times occupy a correct guiding position with respect to the working implement.

I claim:

1. In a guide for a drill steel operating to break down a wall between adjacent drill holes, the combination of a rock drill and a centralizer thereon, a guide for the drill steel extending slidably into the centralizer, and a pilot on the guide to extend into a drill hole for locating the drill steel upon a wall adjacent such drill hole.

2. In a guide for a drill steel operating to break down a wall between adjacent drill holes, the combination of a rock drill and a centralizer thereon, a drill steel for the rock drill extending through the centralizer, a body having a stem to extend slidably into the centralizer, said stem having a guideway for the drill steel, and a pilot on the body to extend into a drill hole for locating the drill steel upon a wall between two drill holes.

3. A guide for a drill steel operating to break down a wall between adjacent drill holes, comprising a body having a guideway to guide a drill steel and having end portions to only partly overlie the drill holes adjacent such wall, said body having a supply passage for pressure fluid extending from one end portion to another of the body and outlets for the passage at the end portions of the body opening at the front end of the body to direct a jet of pressure fluid into each drill hole adjacent a wall being drilled and in a direction parallel to the direction of movement of the drill steel, and an externally fluted pilot on the body to extend into a drill hole for locating a drill steel upon a wall adjacent such drill hole.

ROBERT D. ZIMMERMAN.